(12) United States Patent
Fiebeler

(10) Patent No.: US 9,073,237 B2
(45) Date of Patent: Jul. 7, 2015

(54) GRANULATING DEVICE WITH A DEVICE FOR CONNECTING A MULTI-PART HOUSING OF THE GRANULATING DEVICE

(75) Inventor: Kai Fiebeler, Grossostheim (DE)

(73) Assignee: AUTOMATIK PLASTICS MACHINERY GMBH, Grossostheim (DE)

( * ) Notice: Subject to any disclaimer, the term of this patent is extended or adjusted under 35 U.S.C. 154(b) by 230 days.

(21) Appl. No.: 13/492,665

(22) Filed: Jun. 8, 2012

(65) Prior Publication Data

US 2012/0251651 A1    Oct. 4, 2012

(51) Int. Cl.
*B29B 9/06*  (2006.01)
*B26D 7/26*  (2006.01)

(52) U.S. Cl.
CPC .............. *B29B 9/065* (2013.01); *B26D 7/2621* (2013.01); *B26D 7/2614* (2013.01)

(58) Field of Classification Search
CPC ............ B29B 9/06; B29B 9/065; B26D 7/26; B26D 7/2614; B26D 7/2621
USPC ............. 425/186, 192 R, 307, 308, 311, 313, 425/450, 451.5, 451.6, 67, 68, 70, 71, 382.3
See application file for complete search history.

(56) References Cited

U.S. PATENT DOCUMENTS

| | | | | |
|---|---|---|---|---|
| 3,230,582 A | * | 1/1966 | Hoffman et al. | 425/67 |
| 3,287,764 A | * | 11/1966 | Swickard, Jr. et al. | 425/311 |
| 3,355,767 A | * | 12/1967 | Niemeyer | 425/313 |
| 3,632,279 A | | 1/1972 | Christy | |
| 3,792,950 A | * | 2/1974 | Cuff | 425/313 |
| 4,728,276 A | * | 3/1988 | Pauley et al. | 425/67 |
| 5,059,103 A | * | 10/1991 | Bruckmann et al. | 425/67 |
| 5,223,279 A | * | 6/1993 | Lambertus | 425/186 |
| 6,537,050 B1 | * | 3/2003 | Kasai et al. | 425/67 |
| 7,033,152 B2 | * | 4/2006 | Eloo et al. | 425/67 |
| 8,500,434 B2 | * | 8/2013 | Hehenberger | 425/192 R |
| 2002/0150641 A1 | * | 10/2002 | Ready et al. | 425/67 |
| 2004/0009254 A1 | * | 1/2004 | Eloo et al. | 425/311 |
| 2004/0081716 A1 | * | 4/2004 | Eloo et al. | 425/67 |
| 2004/0115298 A1 | * | 6/2004 | Hehenberger et al. | 425/311 |

FOREIGN PATENT DOCUMENTS

| | | |
|---|---|---|
| DE | 1809470 A1 | 6/1970 |
| DE | 4116933 A1 | 11/1992 |
| DE | 10151434 A1 | 4/2003 |
| DE | 10234229 A1 | 2/2004 |
| EP | 2008784 A1 | 12/2008 |
| JP | 49-043707 B | 11/1974 |
| WO | 2007147162 A2 | 12/2007 |

* cited by examiner

*Primary Examiner* — Seyed Masoud Malekzadeh
(74) *Attorney, Agent, or Firm* — Buskop Law Group, PC; Wendy Buskop

(57) ABSTRACT

A granulating device for producing pellets from a plastic material can have a die plate, a cutting chamber housing adjoining the die plate, and a cutting device with a cutter. The cutting device can be driven via a cutter shaft by a cutter drive device located in a cutter drive housing. The cutting chamber housing can have a cutting chamber housing flange section connected with a cutter drive housing flange section of the cutter drive housing by a connecting element. The connecting element can have a clamping collar arranged to enclose at least one section of the flange sections, and an eccentric closure element. The eccentric closure element can be connected to the clamping collar, and can have an index opening. In a closure position, the index opening can be located in alignment with a locating pin that passes through the index opening.

10 Claims, 4 Drawing Sheets

GRANULATING DEVICE WITH A DEVICE FOR CONNECTING A MULTI-PART HOUSING OF THE GRANULATING DEVICE

CROSS REFERENCE TO RELATED APPLICATIONS

The present application claims priority to and the benefit of co-pending of International Patent Application No. PCT/EP2010/007468, filed on Dec. 08, 2010, entitled "Granulating Device Comprising a Device for Connecting a Multi-Part Housing of the Granulating Device" which claims priority to German Patent Application No. 10 2009 057 781.5, which was filed on Dec. 10, 2009. These references are hereby incorporated in their entirety.

FIELD

The present embodiments generally relate to a granulating device for producing pellets from a plastic material.

BACKGROUND

A need exists for a granulating device with a cutting chamber housing and a cutter drive housing that can be reproducibly and precisely connected together, such as by a single operating person, while also ensuring the elimination of a risk of injury due to a cutter drive that is running when the cutting chamber housing parts and the cutter drive housing are disassembled.

The present embodiments meet these needs.

BRIEF DESCRIPTION OF THE DRAWINGS

The detailed description will be better understood in conjunction with the accompanying drawings as follows.

Figure 1A:
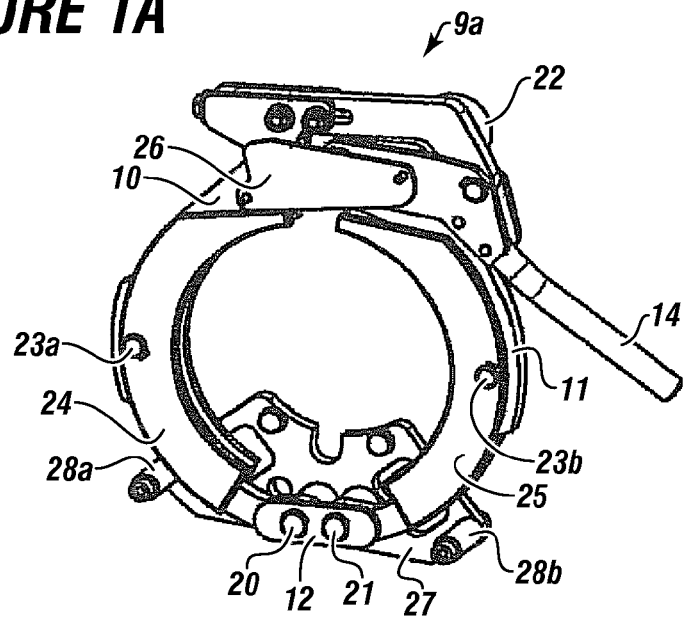
FIG. 1A depicts a schematic perspective view of a connecting element of the granulating device in a closure position according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a granulating device for producing pellets from a plastic material.

The granulating device for producing pellets from the plastic material, such as thermoplastic material, can have a die plate, a cutting chamber housing adjoining the die plate, and a cutting device.

The cutting device can have at least one cutter driven via a cutter shaft by a cutter drive device located in a cutter drive housing.

The cutting chamber housing can have a cutting chamber housing flange section, and the cutter drive housing can have a cutter drive housing flange section. The cutting chamber housing flange section and the cutter drive housing flange section can be connected to one another by a connecting element.

The granulating device with extruders can be used for granulating thermoplastic materials, such as polyethylene or polypropylene. With the extruders, molten thermoplastic material can be pressed through a die plate with nozzle openings into a coolant, such as water, and can be severed there by a cutting device having at least one cutter that passes over openings of the die plate, such that pellets are produced. Underwater granulators can be used for underwater granulation, such as the SPHERO® available from Automatik Plastics Machinery GmbH.

The cutter drive housing can be separately detachable from the cutting chamber housing, such as for replacement of cutters when cutter wear occurs. When attaching the cutter drive housing to the cutting chamber housing, the cutter drive housing and the cutting chamber housing can be precisely positioned relative to one another to achieve appropriate cutting geometry for providing accuracy and reproducibility. The cutter drive housing and the cutting chamber housing can be connected to one another in a fluid-tight manner. Furthermore, the cutter drive housing can be securely and tightly connected to the cutting chamber housing before the granulating device is operated.

The cutting chamber housing and the cutter drive housing can be separated when the cutter device is no longer in operation and when the at least one cutter is no longer rotating; thereby avoiding serious risk of injury for an operator.

In one or more embodiments of the granulating device, the cutting chamber housing and the cutter drive housing can be connected together. For example, a single operating person can simply, reproducibly, and precisely connect the cutting chamber housing and the cutter drive housing together.

The granulating device can also ensure the elimination of a risk of injury when the cutter drive is running while the cutting chamber housing and the cutter drive housing are disassembled.

The connecting element can have a clamping collar arranged, such that the clamping collar encloses at least one section of the cutting chamber housing flange section and the cutter drive housing flange section.

The connecting element can have an eccentric closure element. The eccentric closure element can be connected to relevant sections of the clamping collar.

The eccentric closure element can have at least one index opening. The at least one index opening, in a closure position, can be located in alignment with a locating pin. The locating pin can pass through the at least one index opening.

The relevant sections at which the eccentric closure element can be connected to the clamping collar can be located at respective end regions of the clamping collar.

The clamping collar can have multiple parts. For example, the clamping collar can include two or more clamps that enclose at least one section of the chamber housing flange section and the cutter drive housing flange section.

The clamping collar can enclose an entire circumference or essentially the entire circumference in a region of the chamber housing flange section and the cutter drive housing flange section.

In the closure position, the locating pin, which can be located in alignment in the index opening, can have at least some clearance in the index opening or can fit closely against an inner wall of the index opening. The index opening, the locating pin, or combinations thereof can have a round cross-section. The locating pin and the index opening can also have different cross-sections in which the locating pin fits in alignment in the index opening.

The locating pin and the index opening can have a mutually matching conical shape, triangular cross-section, or combinations thereof, which can improve centering of the locating pin in the index opening.

The eccentric closure element can be arranged such that in a longitudinal direction of the eccentric closure element, i.e. in a closing direction of the eccentric closure element, the eccentric closure element can extend in a circumferential direction of the clamping collar, in a circumferential direction of the cutting chamber housing flange section and the cutter drive housing flange section, or combinations thereof.

One or more embodiments can include multiple index openings, each with multiple locating pins arranged in alignment therewith.

As such, the cutting chamber housing and the cutter drive housing can be reliably positioned and sealingly connected.

The granulating device having the clamping collar and the closure element with the index opening and the locating pin can provide a safe, reliable, and precisely reproducible connection between the cutting chamber housing and the cutter drive housing in a structurally simple manner.

Interaction of the locating pin and the index opening in the closure position can permit for safe operation of the granulating device, including single-handed operation by one operator.

The locating pin in the closure position can enable the operation of the cutter drive device by means of a pickup. The pickup can be or can contain a position monitoring device, can drive a control device, or combinations thereof. The granulating device can be configured to ensure that separation of the cutter drive device with the cutter drive housing from the cutting chamber housing can only take place when the cutter drive device is stopped, such as by means of an initiating device. For example, the initiating device can be an actuator, which can be operated electrically, pneumatically, or hydraulically. As such, it can be ensured that the cutter drive device can only be started using, for example, the control device, when the cutter drive housing is tightly and securely connected to the cutting chamber housing by means of the clamping collar and the eccentric closure element in the closure position.

In one or more embodiments of the granulating device, the locating pin can be movable in an axial direction of the cutting chamber housing and the cutter drive housing between an open position, in which the cutting chamber housing and the cutter drive housing can be separated, and the closure position, in which the locating pin passes through the index opening and thus locks the closure position of the eccentric closure element.

In one or more embodiments of the granulating device, the locating pin can be moved by hand.

In one or more embodiments of the granulating device, the locating pin can be moved automatically. For example, the locking pin can be moved by means of a locating pin actuating device. The locating pin actuating device can be operated pneumatically, hydraulically, or electrically. As such, centering, monitoring, and actuating functions can take place in an automated way.

In one or more embodiments of the granulating device and the eccentric closure element can be implemented as a toggle lever. The eccentric closure element can extend primarily in the direction of the clamping collar that extends circumferentially in the region of the cutting chamber housing flange section and the cutter drive housing flange section, and can be attached to applicable ends of the clamping collar via pivot pins.

The eccentric closure element can be in the form of a disk and can have an operating lever attached thereto. The disk-shaped eccentric closure element can have at least one eccentric cam, in which at least one cam follower attached to a section of the clamping collar can be guided. The at least one cam follower can form a connection between the corresponding section of the clamping collar and the eccentric closure element. The disk-shaped eccentric closure element can be rotatable about an axis of rotation. The at least one eccentric cam and the at least one cam follower guided therein can thus form a gate guide.

In one or more embodiments, a first cam follower can be attached to a first section, such as, a first end of the clamping collar, and guided in the at least one eccentric cam. The first cam follower can also form the connection between the first section of the clamping collar and the eccentric closure element. A pivot pin can be attached to a second section of the clamping collar and to the eccentric closure element, and can form a pivoting connection between the second section of the clamping collar and the eccentric closure element. The at least one eccentric cam and the first cam follower guided therein can thus form an individual gate guide.

In one or more embodiments of the granulating device, the eccentric closure element can have a first eccentric cam therein, within which a first cam follower can be guided. The first cam follower can be attached to the first section, such as the first end of the clamping collar. The first cam follower can form the connection between the corresponding first section of the clamping collar and the eccentric closure element. A second eccentric cam can be provided in the eccentric closure element, within which a second cam follower attached to a second section, such as a second end of the clamping collar, can be guided. The second cam follower can form the connection between the corresponding second section of the clamping collar and the eccentric closure element. The first eccentric cam, second eccentric cam, guided first cam follower, and guided second cam follower can form a double gate guide.

In one or more embodiments, the clamping collar can be a flexible clamping collar having a first clamp half, a second clamp half, and a clamp connection. The first clamp half and the second clamp half can each be pivotably attached by means of clamp pivot pins to the clamp connection. In embodiments, the flexible clamping collar can enclose the entire circumference in the region of the cutting chamber housing flange section and the cutter drive housing flange section, without enclosing the region in which the eccentric closure element is located. In embodiments, the flexible clamping collar can also enclose the region in which the eccentric closure element is located by appropriate elongation of the first clamp half, the second clamp half, or combinations thereof. As such, a reliable connection and clamping of the cutting chamber housing and the cutter drive housing can be achieved.

In one or more embodiments, the clamping collar can have a first clamping jaw pivotably attached to the first clamp half by means of a fastening pin, and a second clamping jaw pivotably attached to the second clamp half by means of a fastening pin; thereby improving the connection of the cutting chamber housing and the cutter drive housing. As such, the clamping and sealing connection of the cutting chamber housing and the cutter drive housing can be ensured in a reliable manner because a possible tilting of the clamping collar can be reliably prevented, and an application of force to the connection of the cutting chamber housing and the cutter drive housing in the region of the cutting chamber housing flange section and the cutter drive housing flange section that is uniform over the circumference can be achieved.

The eccentric closure element can be attached to the clamping collar in a rotatable manner at two points, such as in the form of a toggle lever, for example. A cam follower can be attached to a section of the clamping collar and can project through at least one eccentric cam of a suitably designed disk-shaped eccentric closure element. Embodiments can include two eccentric cams, each connected to relevant sections of the clamping collar through one of two cam followers. In operation, if the eccentric closure element is pivoted, the clamping collar can open or close accordingly. The connecting element and the eccentric closure element or the clamping collar can be attached to an additional adapter or a mounting plate, which in turn can be attached to the granulating device, such as to the cutting chamber housing or the cutter drive housing.

In operation, the connecting element of the granulating device can be safely locked only when the clamping collar is closed in a closure position with the locating pin aligned in the index opening via the closure element. A pickup can be provided. For example, the pickup can be mounted on the cutting chamber housing as a corresponding mating part. By means of the pickup, it can be possible to query the closure position and ensure that operation of the cutter drive device is not enabled until then.

Figure 1B:
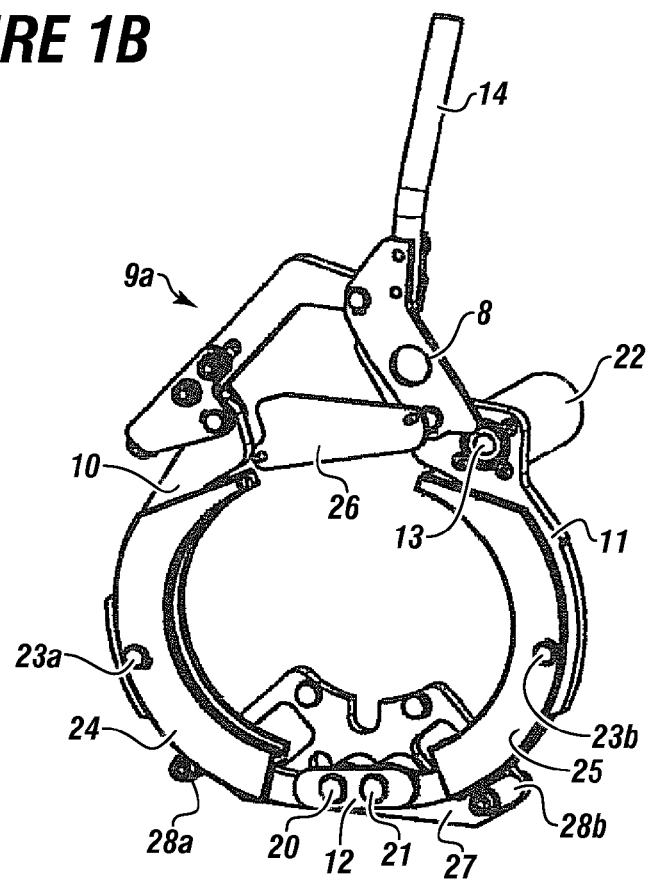
FIG. 1B depicts a schematic perspective view of the connecting element of FIG. 1A in an open position according one or more embodiments.

Turning now to the Figures, FIG. 1A depicts a schematic perspective view of the connecting element of the granulating device a closure position according to one or more embodiments, and FIG. 1B depicts a schematic perspective view of the connecting element of the granulating device of FIG. 1A in an open position.

The connecting element can connect the cutting chamber housing having the cutting chamber housing flange section to the cutter drive housing having the cutter drive housing flange section, such as in the region of the cutting chamber housing flange section and the cutter drive housing flange section, for producing pellets from a plastic material.

The connecting element can have a three-piece clamping collar with a first clamp half 10, a second clamp half 11, and a clamp connection 12. The first clamp half 10 can be rotatably attached to the clamp connection 12 by means of a first clamp pivot pin 21. The second clamp half 11 can be rotatably attached to the clamp connection 12 by means of a second clamp pivot pin 20.

The three-piece clamping collar can have a first clamping jaw 24 pivotably attached to the first clamp half 10 by means of a first fastening pin 23a. A second clamping jaw 25 can be pivotably attached to the second clamp half 11 by means of a second fastening pin 23b.

The connecting element can have a mounting plate 27, which can, in the manner of an adapter, permit the attachment and securing of the connecting element to, for example, the cutter drive housing or the cutter drive housing flange section. The mounting plate 27 can have stops 28a and 28b that can limit pivoting motion of the first clamp half 10, the second clamp half 11, the first clamping jaw 24, and the second clamping jaw 25, while the connecting element is in the open position.

The three-piece clamping collar can be designed such that at least one section of the cutting chamber housing flange section and the cutter drive housing flange section is enclosed, which can result is an essentially complete enclosure around nearly the entire circumference of the corresponding flange sections.

The connecting element can have an eccentric closure element 9a, which can be connected to relevant sections of the three-piece clamping collar, such as to the first clamp half 10 on one side and to the second clamp half 11 on the other side.

In embodiments, the eccentric closure element 9a can be a toggle lever that can be actuated by an operating lever 14, which can be connected by means of pivot pins.

The eccentric closure element 9a can have an initiator plate 26, which can cover an index opening 8 of the eccentric closure element 9a. The index opening 8 can be located in alignment with a locating pin 13 in the closure position of the connecting element, such that the locating pin 13 passes through the index opening 8 in the closure position.

The locating pin 13 can be movable by hand. In embodiments, a locating pin actuating device 22 can be provided by means of which the locating pin 13 is appropriately movable. The locating pin actuating device 22 can be actuated pneumatically, hydraulically, or electrically; thereby allowing the actuation process of the locating pin 13 to be automated.

The operation of the cutter drive device of the granulating device with the connecting element can be enabled in the closure position by means of a pickup, which can be provided in the region of the locating pin actuating device 22, for example.

The initiator plate 26 can be connected with the locating pin 13 in the closure position, by which means it can be possible to close an electrical contact; thereby serving as an additional signal that the locking of the connecting element in the closure position has taken place correctly. Accordingly, this can also be used as a signal for enabling the operation of the cutter drive device in order to further improve the safety of the operation of the granulating device.

With the eccentric closure element 9a designed as a toggle lever, the eccentric closure element 9a, in its clamping function, can act in the circumferential direction of the connecting element, such that the connecting element can be easily operated by one person via the operating lever 14.

The connecting element can permit simple connection of the cutting chamber housing and the cutter drive housing of the granulating device, which can be carried out with one hand by an operator using the connecting element, without requiring the operator to first apply a clamp holder and then close the clamp holder at several points while holding the clamp holder. Furthermore, because of the mounting plate 27 with the stops 28a and 28b, it is unnecessary, when separating the cutting chamber housing and the cutter drive housing, to separately hold the connecting element while pulling the cutting chamber housing and the cutter drive housing apart.

In FIG. 1B, the three-piece clamping collar of the connecting element is depicted in the open position of the eccentric closure element 9a.

In the open position, the locating pin 13 can be retracted axially to a rear, such that the locating pin 13 does not pass through the index opening 8. Also, in the open position, the locating pin 13 does not stand in connection with the initiator plate 26. Hence, no corresponding signal contact is present. Thus, in the open position, there is no corresponding signal that would enable the operation of the cutter drive device. A safe and reliable shutdown of the cutter drive device can thus be made possible in a simple manner.

Figure 2A:
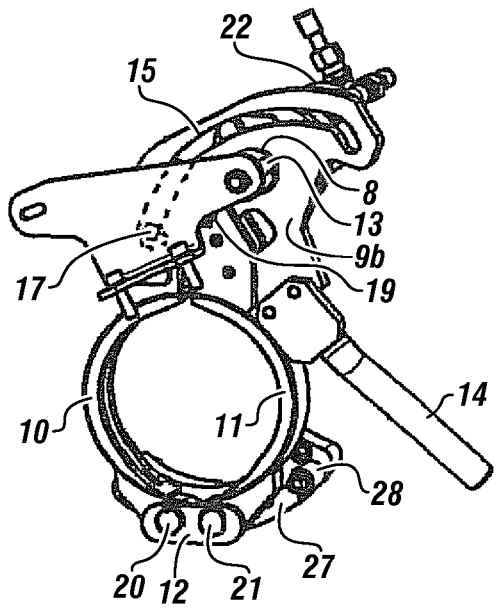
FIG. 2A depicts a schematic perspective view of the connecting element in a closure position according to one or more embodiments.
Figure 2B:
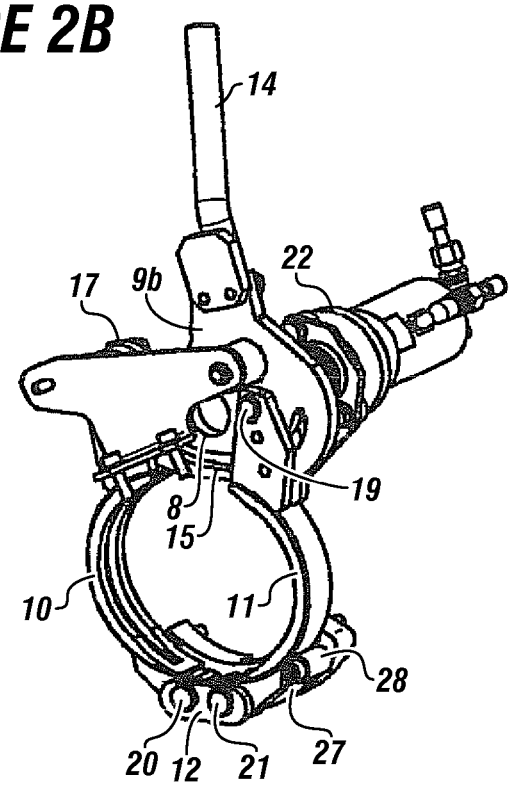
FIG. 2B depicts a schematic perspective view of the connecting element of FIG. 2A in an open position.

FIG. 2A depicts a schematic perspective view of the connecting element of the granulating device in a closure position according to one or more embodiments, and FIG. 2B depicts a schematic perspective view of the connecting element of FIG. 2A in an open position.

The connecting element can include an eccentric closure element 9b that is designed in the form of a disk having the operating lever 14 attached thereto.

The eccentric closure element 9b, or disk-shaped eccentric closure element, can have an eccentric cam 15, within which a cam follower 17 attached to the first clamp half 10 of the clamping collar can be guided. The cam follower 17 can form the connection between the corresponding section, such as between the first clamp half 10 of the clamping collar and the eccentric closure element 9b.

A pivot pin 19 can be attached to the second section of the clamping collar, such as to the second clamp half 11. The pivot pin 19 can also be attached to the eccentric closure element 9b, and hence can constitute a pivoting connection between the corresponding second section, or the second clamp half 11 of the clamping collar, and the eccentric closure element 9b.

The eccentric closure element 9b can be designed with or without the first clamping jaw and the second clamping jaw.

The clamping collar can include the first clamp half 10, the second clamp half 11, and the clamp connection 12, which can be connected via the first clamp pivot pins 21 and the second clamp pivot pin 20.

The eccentric closure element 9b can be rotatable about an axis of rotation, such as about the pivot pin 19, and can be oriented essentially in or parallel to a plane of the circumference of the connecting element and the clamping collar.

The eccentric closure element 9b with the eccentric cam 15 can permit one-handed operation by a single operator.

The eccentric closure element 9b can have the index opening 8, which, in the closure position, can be located in alignment with the locating pin 13. The locating pin 13 can pass through the index opening 8. By means of a pickup, the operation of the cutter drive device of the granulating device can be enabled. The eccentric closure element 9b can also have the locating pin actuating device 22, the mounting plate 27, and the stop 28.

The eccentric closure element 9b can be designed with the initiator plate or without the initiator plate.

When the eccentric closure element 9b is pivoted into the open position, the locating pin 13 does not pass through the index opening 8. In this way, operation of the cutter drive device is not enabled, and safe handling of the cutter drive device is possible for the operator without risk of injury.

Figure 3A:
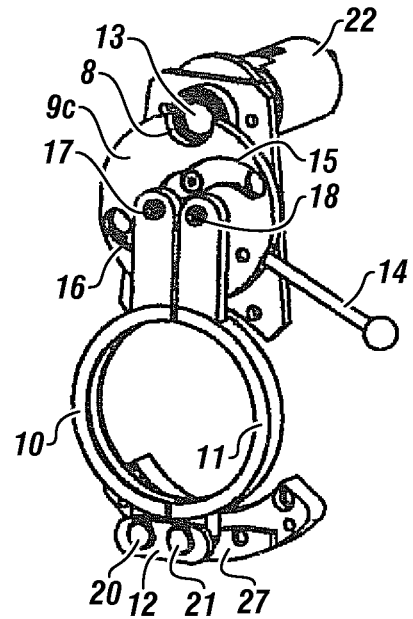
FIG. 3A depicts a schematic perspective view of the connecting element in a closure position according to one or more embodiments.
Figure 3B:
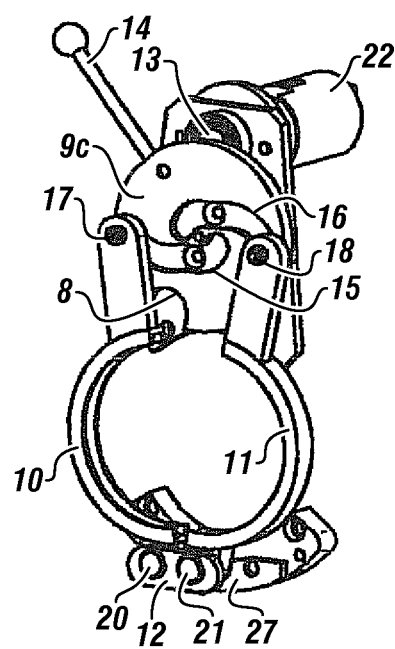
FIG. 3B depicts a schematic perspective view of the connecting element of FIG. 3A in an open position.

FIG. 3A depicts a schematic perspective view of the connecting element of the granulating device in a closure position according to one or more embodiments, and FIG. 3B depicts a schematic perspective view of the connecting element of FIG. 3A in an open position.

The connecting element can include the eccentric closure element 9c, which can be in the form of a disk, and can have a first eccentric cam 15. A first cam follower 17 can be attached to a first section of the clamping collar, such as to the first clamp half 10, and can be guided in the first eccentric cam 15. The first cam follower 17 can constitute the connection between the corresponding first section of the clamping collar and the eccentric closure element 9c.

The eccentric closure element 9c, or disk-shaped eccentric closure element, can have a second eccentric cam 16. A second cam follower 18 can be attached to the second section of the clamping collar, such as to the second clamp half 11, and can be guided in the second eccentric cam 16. The second cam follower 18 can constitute the connection between the corresponding second section of the clamping collar and the eccentric closure element 9c.

The index opening 8 of the eccentric closure element 9c can be a milled index slot in an edge region of the eccentric closure element 9c rather than an index hole.

The eccentric closure element 9c can be arranged such that eccentric action of the eccentric closure element 9c operates in the circumferential direction of the connecting element and the corresponding clamping collar.

The eccentric closure element 9c can permit one-handed operation by a single operator.

The first clamp half 10 can be rotatably attached to the clamp connection 12 by means of the first clamp pivot pin 21, and the second clamp half 11 can be rotatably attached to the clamp connection 12 by means of the second clamp pivot pin 20.

The eccentric closure element 9c can also include the mounting plate 27, the operating lever 14, the locating pin 13, and the locating pin actuating device 22.

Figure 4:
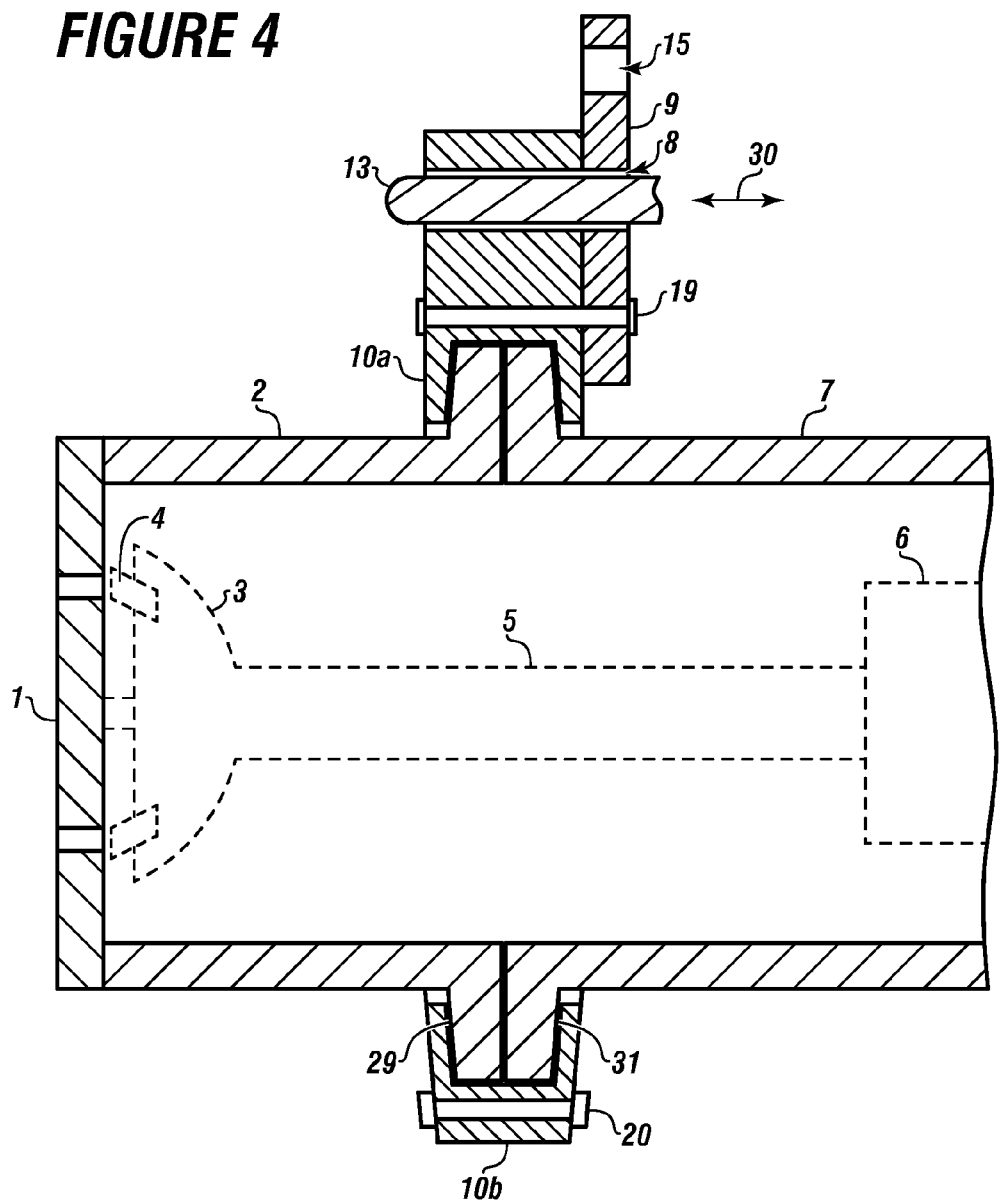
FIG. 4 depicts a schematic cross-sectional view of a portion of the granulating device with the connecting element in a closure position according to one or more embodiments.

FIG. 4 depicts a schematic cross-sectional view of a portion of the granulating device with the connecting element in the closure position according to one or more embodiments.

The granulating device can serve to produce pellets from a plastic material, and can have a die plate 1 with a cutting chamber housing 2 adjoining the die plate 1.

A cutting device 3 can have at least one cutter 4, which can be driven via a cutter shaft 5 by a cutter drive device 6 located in a cutter drive housing 7.

The cutting chamber housing 2 can have a cutting chamber housing flange section 29. The cutter drive housing 7 can have a cutter drive housing flange section 31.

The cutting chamber housing flange section 29 and the cutter drive housing flange section 31 can be somewhat conical in cross-section.

The clamping collar can have an appropriately designed contour. As such, the clamping collar can clamp together the cutting chamber housing 2 and the cutter drive housing 7 in the closure position of the eccentric closure element 9 at the region of the cutting chamber housing flange section 29 and the cutter drive housing flange section 31 by means of the first clamp half 10a and 10b. The clamping collar can also include the first eccentric cam 15, the pivot pin 19, and the second clamp pivot pin 20.

In the closure position, the locating pin 13 can be located in alignment with the index opening 8, and can pass through the index opening 8. By means of the locating pin actuating device, the locating pin 13 can be axially movable along the axis 30.

The eccentric closure element 9 can be arranged such that the eccentric closure element 9 is located and movable therebetween in or parallel to the plane of the cutting chamber housing flange section 29 and the cutter drive housing flange section 31.

As such, a simple, reproducible, and precise connection of the cutting chamber housing 2 and the cutter drive housing 7 of the granulating device can be possible, and can be performed in a one-handed operation by a single operator.

Also, a possible risk of injury when the cutter drive device 6 is moving can be avoided, since operation of the cutter drive device 6 is not enabled in the open position. The index opening 8 with the locating pin 13 can thus provide for safe operation of the granulating device.

While these embodiments have been described with emphasis on the embodiments, it should be understood that within the scope of the appended claims, the embodiments might be practiced other than as specifically described herein.

What is claimed is:

1. A granulating device for producing pellets from a plastic material comprising:
   a. a die plate;
   b. a cutting chamber housing adjoining the die plate; and
   c. a cutting device with at least one cutter driven via a cutter shaft by a cutter drive device located in a cutter drive housing, wherein the cutting chamber housing has a cutting chamber housing flange section, wherein the cutter drive housing has a cutter drive housing flange section, wherein the cutting chamber housing flange section and the cutter drive housing flange section are connectable by a connecting element, and wherein the connecting element comprises:
      (i) a clamping collar arranged to enclose at least one section of the cutting chamber housing flange section and the cutter drive housing flange section; and
      (ii) an eccentric closure element, wherein the eccentric closure element is connected to sections of the clamping collar, wherein the eccentric closure element has at least one index opening, and wherein, in a closure position, the at least one index opening is located in alignment with a locating pin that passes through the at least one index opening, wherein the eccentric closure element is a disk and has an operating lever attached thereto, wherein the eccentric closure element has at least one eccentric cam within which is guided at least one cam follower, wherein the at least one cam follower is attached to a section of the clamping collar, and wherein the at least one cam follower constitutes a connection between a corresponding section of the clamping collar and the eccentric closure element; and
   wherein the locating pin, when in the closure position, passes through the at least one index opening to lock the eccentric closure element in place and enable operation of the cutting device by a pickup mechanism; and
   further wherein the locating pin, when in an open position, prevents operation of the cutting device.

2. The granulating device of claims 1, wherein the locating pin is movable by a locating pin actuating device, and wherein the locating pin actuating device is driven pneumatically, hydraulically, or electrically.

3. The granulating device of claim 1, wherein the locating pin is movable by hand.

4. The granulating device of claim 1, wherein the eccentric closure element is a toggle lever.

5. The granulating device of claim 1, wherein the clamping collar has a first clamp half, a second clamp half, and a clamp connection, and wherein the first clamp half and the second clamp half are each pivotably attached by clamp pivot pins to the clamp connection.

6. The granulating device of claim 5, wherein the clamping collar has a first clamping jaw pivotably attached to the first clamp half by a first fastening pin, and a second clamping jaw pivotably attached to the second clamp half by a second fastening pin.

7. The granulating device of claim 1, wherein a first cam follower of the at least one cam follower is attached to a first section of the clamping collar and is guided in the at least one eccentric cam, wherein the first cam follower constitutes a connection between a corresponding first section of the clamping collar and the eccentric closure element, wherein a pivot pin is attached to a second section of the clamping collar and to the eccentric closure element, and wherein the pivot pin constitutes a pivoting connection between the second section of the clamping collar and the eccentric closure element.

8. The granulating device of claim 1, wherein a first cam follower of the at least one cam follower is guided in a first eccentric cam of the at least one eccentric cam, wherein the first cam follower is attached to a first section of the clamping collar, wherein the first cam follower constitutes a connection between a corresponding first section of the clamping collar and the eccentric closure element, wherein a second eccentric cam of the at least one eccentric cam guides a second cam follower of the at least one cam follower, wherein the second cam follower is attached to a second section of the clamping collar, and wherein the second cam follower constitutes a connection between the second section of the clamping collar and the eccentric closure element.

9. The granulating device of claim 8, wherein the clamping collar has a first clamp half, a second clamp half, and a clamp connection, and wherein the first clamp half and the second clamp half are each pivotably attached by clamp pivot pins to the clamp connection.

10. The granulating device of claim 9, wherein the clamping collar has a first clamping jaw pivotably attached to the first clamp half by a first fastening pin, and a second clamping jaw pivotably attached to the second clamp half by a second fastening pin.

* * * * *